No. 886,176. PATENTED APR. 28, 1908.
P. C. BLIVEN.
TROLLEY HARP.
APPLICATION FILED MAY 23, 1907.

Witnesses
P. E. Barnes

Inventor
Percy C. Bliven.
By Victor J. Evans
Attorney

UNITED STATES PATENT OFFICE.

PERCY C. BLIVEN, OF DANIELSON, CONNECTICUT.

TROLLEY-HARP.

No. 886,176.     Specification of Letters Patent.     Patented April 28, 1908.

Application filed May 23, 1907. Serial No. 375,287.

*To all whom it may concern:*

Be it known that I, PERCY C. BLIVEN, a citizen of the United States of America, residing at Danielson, in the county of Windham and State of Connecticut, have invented new and useful Improvements in Trolley-Harps, of which the following is a specification.

This invention relates to trolley harps, and one of the principal objects of the same is to dispense with the usual bushing for the trolley wheel and to provide means whereby the wheel may be quickly detached from the harp.

Another object of the invention is to provide a trolley harp of simple construction to be used in connection with a trolley wheel having an axle rigidly secured thereto, bearings being provided in the harp for the ends of the axle, and means being provided for lubricating the axle.

Figure 1:
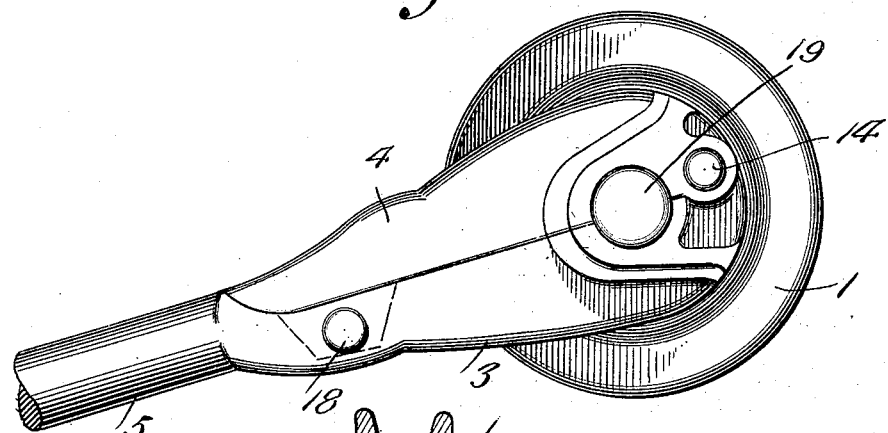
Figure 2:
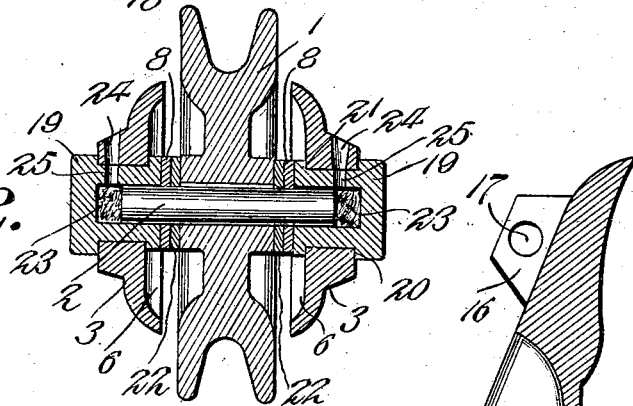
Figure 3:
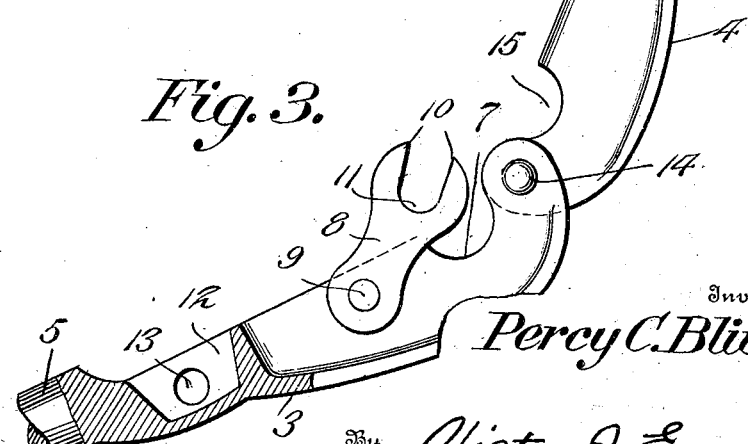

These and other objects may be attained by means of the construction illustrated in the accompanying drawing, in which:

Figure 1 is a side elevation of a trolley harp made in accordance with my invention. Fig. 2 is a sectional view through the wheel and harp in line with the axle of the wheel. Fig. 3 is a sectional view taken longitudinally through the harp, and the hinged member of the harp being shown opened out to admit the axle of the trolley wheel.

Referring to the drawing for a more particular description of my invention, the numeral 1 designates a trolley wheel to which is rigidly connected an axle 2 comprising a cylindrical, steel rod of equal diameter from end to end, and the opposite ends of said axle projecting beyond the hub of the trolley wheel at opposite sides thereof.

The trolley harp comprises the stationary member 3, and the pivoted member 4, said stationary member being formed on or connected to the upper end of the trolley pole 5, said stationary member comprising two spaced sections having concaved inner sides 6 and rounded recesses 7 for the axle bearings. Pivotally connected to the inner walls of the rigid member 3 is a stirrup or yoke 8, said stirrup being pivoted upon the pin 9 and provided with spaced arms 10 and an intermediate notch or bearing 11 for the ends of the axle 2. Formed in the stationary member 3 is a recess 12 provided with a transverse pin pole 13.

The pivoted member 4 of the harp is pivoted at 14 to the stationary member, and is provided with a notch 15 corresponding to the recess 7 in the stationary member 3. A lug 16 is formed on the inner side of the pivoted member 4, said lug being provided with a pin opening 17, and said lug adapted to be brought down into the recess 12, and said two members being connected by means of a removable pin 18 which extends through the pin holes 13 and 17.

Bearing caps 19 provided with an exterior annular shoulder 20 and an interior annular flange 21 are fitted to the opposite ends of the axle 2, said bearing fitting in the recesses 7 and the notches 15 in the members 3 and 4 of the harp. Washers 22 are placed upon the axle 2 between the yoke 8 and the hub of the trolley wheel. A suitable lubricating packing 23 is placed in the bearing caps 19 and oil holes 24 are formed in the pivoted members 4, said oil holes communicating through oil ducts 25 with the packing 23 at the ends of the axle.

From the foregoing it will be obvious that I dispense with the usual bushing which is the source of continual annoyance in trolley wheels for the reason that the bushings wear away very rapidly, and thus prevent the proper operation of the trolley wheel. Furthermore, by means of my invention a trolley wheel may be readily removed from the harp for repairs or renewals by removing the pin 18 and throwing up the member 4.

My invention is of simple construction, is composed of comparatively few parts, is durable and efficient in use and any style of trolley wheel can be readily fitted thereto.

Having thus described the invention, what I claim is:

1. A trolley harp comprising a stationary member having spaced arms, a member pivotally connected to the stationary member at the outer end thereof, yokes pivoted to the stationary member, bearing caps connected to said member, in combination with a trolley wheel having a rigidly connected axle, the ends of which are journaled in the bearing caps.

2. A trolley harp comprising a stationary member and a pivoted member, a removable pin for holding said two members in position, bearing caps connected between said two members, yokes pivoted to the stationary member and provided with spaced arms to engage the axle of the trolley wheel, in combination with a trolley wheel having a rigidly connected axle, the ends of which are journaled in the bearing caps, lubricating packing in said bearing caps, and means whereby a lubricant may be fed to the lubricating packing.

In testimony whereof, I affix my signature in presence of two witnesses.

PERCY C. BLIVEN.

Witnesses:
JAMES M. PAINE,
MAUDE A. PHILLIPS.